United States Patent [19]
Freund et al.

[11] Patent Number: 6,138,169
[45] Date of Patent: Oct. 24, 2000

[54] SYSTEM AND METHOD FOR CREATING AN OBJECT ORIENTED TRANSACTION SERVICE THAT ACHIEVES INTEROPERABILITY WITH ENCINA PROCEDURAL TRANSACTIONS

[75] Inventors: Thomas James Freund, Winchester; Simon Anthony James Holdsworth, Andover, both of United Kingdom; Stanley Alan Smith, Austin, Tex.

[73] Assignee: International Business Machines Corporation, Armonk, N.Y.

[21] Appl. No.: 08/840,999

[22] Filed: Apr. 22, 1997

Related U.S. Application Data

[63] Continuation of application No. 08/355,870, Dec. 14, 1994, abandoned.

[51] Int. Cl.[7] .................................................. G06F 15/163
[52] U.S. Cl. .................................................. 709/313; 707/1
[58] Field of Search .................................. 395/680–685; 709/300–305, 311–332

[56] References Cited

U.S. PATENT DOCUMENTS

| 5,249,293 | 9/1993 | Schreiber et al. | 395/650 |
|---|---|---|---|
| 5,280,610 | 1/1994 | Travis, Jr. et al. | 395/600 |
| 5,329,619 | 7/1994 | Pagé et al. | 395/200 |
| 5,363,121 | 11/1994 | Freund et al. | 395/600 |
| 5,404,529 | 4/1995 | Chernikoff et al. | 395/700 |
| 5,542,078 | 7/1996 | Martel et al. | 395/600 |

OTHER PUBLICATIONS

Ahmed et al, "Pegasus" A system for seamless integration of heterogeneous information sources, IEEE, pp. 128136, 1991.

Rafii et al, "Integration strategies in Pegasus Object Oriented multidabase system", IEEE, pp. 323–334, 1992.

Ahmed et al, "An Overview if Pegasus", IEEE, pp. 273–277, 1993.

Ahmed et al, "Multidatabase management in Pegasus", IEEE, pp. 166–173, 1991.

Betz, Mark, "Interoperable objects, Laying the foundation for distributed object computing", *Dr. Dobb's Journal*, Oct. 1994, V19, n11 p18(13).

*The Common Object Request Broker: Architecture and Specification*, OMG Document No. 91.12.1, Revision 1.1, Dec. 1991, pp. 13–44.

X/Open CAE Specification, *Distributed Transaction Processing: The XA Specification*, X/Open Company Ltd., pp. 1–8.

X/Open Preliminary Specification, *Distributed Transaction Processing: The TX (Transaction Demarcation) Specification*, X/Open Company Ltd., pp. 1–11.

*Object Transaction Service*, OMG Document 94.8.4, Aug., 1994, pp. 1–103.

*Primary Examiner*—Majid A. Banankhah
*Assistant Examiner*—Pat Caldwell
*Attorney, Agent, or Firm*—Felman, Bradley, Gunter & Dillon; Mark S. Walker

[57] ABSTRACT

A system and method for using the TRAN procedural transaction coordinator, from the Encina product produced by Transarc Corporation, as the core of an OMG-compliant Object Transaction Service. The method allows the object-oriented Object Transaction Service to interoperate with Encina procedural applications. The interoperation involves coordinated processing of both object oriented transactional requests and Encina procedural transactional requests. Both object oriented and procedural requests can be part of a single atomic transaction without requiring gateways between the products. A system of implementation classes are used to transform object-oriented method invocations into the necessary procedural calls. The implementation classes also accept upcalls from the procedural TRAN and transform them into the necessary Object Transaction Service method invocations.

15 Claims, 7 Drawing Sheets

SYSTEM AND METHOD FOR CREATING AN OBJECT ORIENTED TRANSACTION SERVICE THAT ACHIEVES INTEROPERABILITY WITH ENCINA PROCEDURAL TRANSACTIONS

This is a continuation of application Ser. No. 08/355,870 filed Dec. 14, 1994, now abandoned.

CROSS-REFERENCE TO RELATED APPLICATIONS

The present application is related to the application entitled, "A System and Method for Creating an Object Oriented Transaction Service that Interoperates with Procedural Transaction Coordinators," filed Oct. 11, 1994 and bearing application Ser. No. 08/320,357.

BACKGROUND OF THE INVENTION

1. Field of the Invention

The present invention relates to computer implemented transaction processing systems including stand-alone and distributed transaction processing systems. More particularly, the present invention relates to the use of computer implemented objects to implement a transaction processing system that supports object oriented transaction processing, but also integrates with the Transarc Encina procedural transaction management service. Still more particularly, the present invention provides a system and method for causing object oriented transaction processing applications to interoperate with procedural transaction processing applications developed for the Encina product. Interoperation requires that object generated requests and Encina transactional requests can be used within a single atomic transaction without requiring use of a transaction gateway.

2. Background and Related Art

Computer implemented transaction processing systems are used for critical business tasks in a number of industries. A transaction defines a single unit of work that must either be fully completed or fully purged without action. For example, in a bank automated teller machine (ATM) from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and actual occurrences.

Distributed transaction processing involves a transaction that affects resources at more than one physical or logical location. In the above example, an ATM transaction affects resources managed at the local ATM device as well as bank balances managed by a bank's main computer. A distributed transaction may not be physically distributed bit may involve cooperating tasks that must be completed in synchrony for successful transaction completion.

The X/Open Company Limited (X/Open is a trademark of X/Open Company Ltd.) has promulgated a guide that describes one model for implementing distributed transaction processing. The *X/Open Guide, Distributed Transaction Processing Reference Model*, October, 1991, discusses the components of a distributed transaction system and the interrelationships between them. The X/Open Distributed Transaction Processing Model (the DTP Model) describes three main components: an Application Program (AP), a Transaction Manager (TM), and one or more Resource Managers (RMs). The Application Program uses and modifies the resources controlled by one or more of the Resource Managers. The Transaction Manager is responsible for global transactions and coordinates the decision whether to commit or roll-back the actions taken by the Resource Managers. (Commit causes the resources to be updated while roll-back causes all work to be discarded returning the resources to the state they were in upon transaction initiation.) The Resource Managers manage specific resources. Resource managers may include a database management system (DBMS), a file system, or similar resource.

Object oriented programming systems are designed to increase the efficiency of program development by enabling object reuse and simplifying system maintenance through clear separation of function.

Each object in an object oriented system encapsulates the data for that object and the procedures or methods for operating on that data. Encapsulation means that the data for an object can be manipulated only by that object using the defined methods.

Object oriented systems also implement object inheritance. Inheritance allows a more specific object to be derived from a general object. The more specific object can "inherit" all of the data and methods of the parent object, but can override selected data and methods and add others to implement its unique function.

The application of object oriented techniques to transaction processing systems raises many new issues but offers opportunities to increase system efficiency through the use of object oriented principles. The Object Management Group, Inc. (OMG) has established standards for interoperable object oriented systems. The overall architecture defined by OMG is the Common Object Request Broker Architecture (CORBA). CORBA defines the interactions between objects, and in particular, between distributed objects in different computer systems. OMG has accepted a specification to standardize transaction processing in object oriented systems. This specification, entitled the *Object Transaction Service (OTS) Specification,* sets forth the requirements for object services necessary to implement a transaction processing system. The OTS specification uses many of the unique capabilities of object oriented systems. The OTS model, however, is designed to allow object oriented systems to operate with the X/Open DTP model and with existing procedural transaction processing systems. The OTS Specification does not, however, define a system for allowing interoperability in a system supporting both object oriented and procedural requests in a single atomic transaction.

The OMG Object Transaction Service describes mapping of the object oriented interfaces to existing X/Open DTP interfaces to show correspondence between elements of the interfaces. This mapping is all that is specified in the OMG submission. The overall problem remains to find a mechanism to isolate the application program interfaces and then to develop specific methods (procedures) to implement that isolation. The first problem within this overall problem is to define the methods necessary to allow object oriented transactional requests to interoperate with procedural transactional requests. Specifically, the first problem is to interoperate with procedural transactional requests from the Transarc Encina product. These methods must allow for and support coordination of two-phase commit protocols between the OMG Object Transaction Service model and the Encina product. The OTS Specification mapping is between OMG functions (such as demarcation, propagation, involvement, and coordination) and Encina transaction manager interfaces (such as the formal two-phase commit protocols, transaction identifiers, and transaction states). The two phase commit coordination must occur within the transaction service and be isolated from the user interface level.

A second problem is the lack of a mechanism to allow transactional object oriented application program requests to effectively exist with Encina transactional procedural application program requests in a single atomic transaction. In particular, there is a need to develop an object based system and method to operate object-oriented application interfaces while also operating Encina transaction services without requiring changing the Encina procedural operations within an application program.

An additional problem is the need for an object based structure that is flexible enough to allow the Encina procedural transaction manager to be used by the object oriented system without changing that object structure. Creating such an object structure would allow OMG Object Transaction Service interfaces to the client applications, Object Request Brokers, and resources (Resource Managers) to be preserved and while also preserving the classes that implement the function defined in the OMG OTS class specifications.

A related technical problem is the need to develop a set of object oriented classes to efficiently connect object oriented applications to procedural transaction managers without modifying either the procedural transaction manager or existing procedural applications. A solution to this problem is defined by U.S. patent application Ser. No. 08/320,357 entitled, "A System and Method for Creating an Object Oriented Transaction Service that Interoperates with Procedural Transaction Coordinators," which was filed on Oct. 11, 1994.

The technical problem addressed by the present invention is to develop a set of object oriented classes and class structure that will allow transactional requests to exist in a single atomic transaction with existing Encina transactional requests. This interoperation must be done without requiring the modification of either the Encina transaction manager or the existing applications using Encina interfaces. This interoperation must be done without requiring a gateway function between the transaction services.

SUMMARY OF THE INVENTION

The present invention is directed to a system and method for implementing an object transaction service that supports all OMG object oriented OTS application interfaces and provides interoperation with the existing Encina procedural transaction managers.

The present invention modifies OTS classes and adds to them to support differing procedural transaction managers. The changes to provide this support are encapsulated within the implementation classes and class structure described in this invention. These implementation classes provide the bridge between the object oriented environment and the existing Encina product.

The present invention is directed to a computer implemented system for interoperably processing object oriented transaction requests with procedural transaction requests using an existing procedural transaction coordinator, the system comprises: a procedural coordinator having a plurality of procedural programming interfaces; first means for requesting transaction processing through the plurality of procedural programming interfaces from an object oriented transaction processing system, the first means for requesting returning a first result; second means for requesting transaction processing through the plurality of procedural programming interfaces from a procedural transaction processing system, the second means for requesting returning a second result; means for invoking an object oriented processing method from the procedural coordinator; and means for coordinating transaction completion such that a transaction result depends upon both the first and second results.

The present invention is directed to an object structure that includes implementation classes arranged to link the functions defined for the object oriented OMG OTS environment and existing Encina procedural transaction managers running in existing procedural environments. These classes provide a replaceable bridge between the OMG based classes and the actual Encina code running on a system. Implementation classes respond to messages generated by an OMG OTS compliant object and transform these messages into the Encina procedural calls necessary to coordinate the required action using the Encina transaction manager. The implementation classes also receive calls from the Encina transaction manager and use that information to update OTS based objects in the system.

It is therefore an object of the present invention to provide a system that includes objects specifically structured and linked to bridge an object oriented transaction system to the Encina procedural transaction system supporting existing procedural applications.

It is yet another object of the invention to provide a process for performing transactions using object oriented application program interfaces to affect an underlying Encina transaction manager.

It is yet another object of the invention to provide an object structure that allows the TRAN portion of the Encina transaction manager to replace the OTS core transaction manager without requiring changes to the OTS classes that provide the OMG specified interfaces and behaviors.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
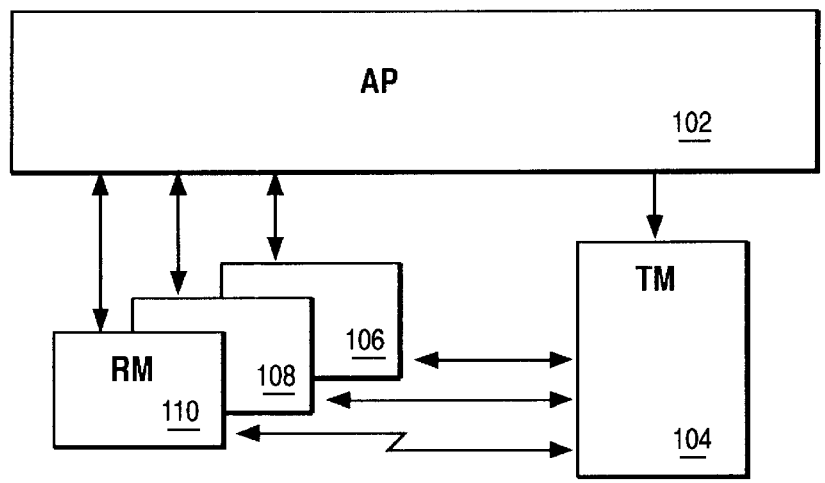
FIG. 1 is a block diagram illustrating the X/Open Distributed Transaction Processing Model.

The X/Open Distributed Transaction Processing (DTP) model is shown generally in FIG. 1. An Application Program 102 executes and causes data or other resources to change state. Resources are managed by Resource Managers 106 108 110, each of which can be a database management system (DBMS), file management system, communication Resource Managers (such as CPI-C, TxRPC, XATMI) or similar system. The Resource Managers may be distributed on computer systems remote from the system executing the Application Program 102 or they may be implemented as separate processes within the same computer system. Transaction Manager 104 controls the completion of processing for each particular transaction initiated by Application Program 102. Transaction Manager 104 coordinates the actions of the Resource Managers to ensure that all resources are in a consistent state at the end of the transaction. This coordination ensures that the transaction appears to operate atomically, i.e. the transaction either changes all resources associated with the transaction or it changes none of them.

Figure 2:
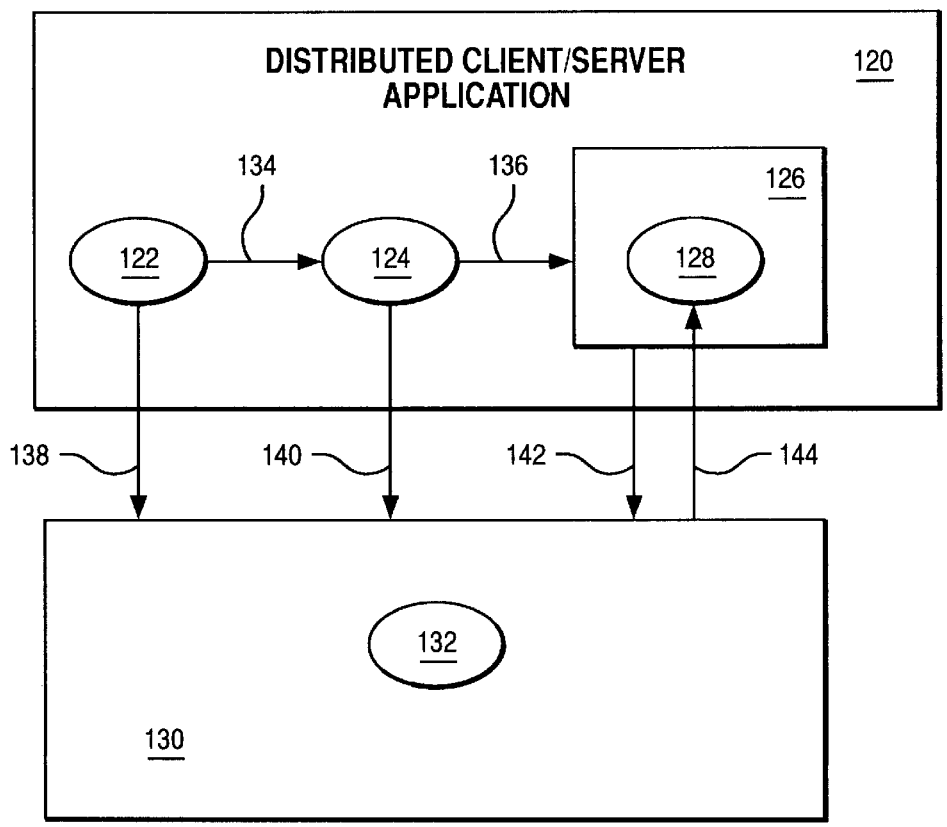
FIG. 2 is a block diagram illustrating the OMG Object Transaction Services model.

The Object Transaction Services model defined by the Object Management Group is shown generally in FIG. 2. A distributed client/server (C/S) application is shown at 120. The application 120 comprises a number of objects that exchange messages to accomplish the actions required by the transaction. The objects present in the application include one or more Transactional Clients 122 that invoke operations of transactional objects. The object that begins a transaction is the transaction originator and the originator sends a message 138 to the Transactional Service at the beginning and end of a transaction. A transactional object is an object whose behavior is affected by being invoked within the scope of a transaction. A transactional object typically contains or refers to persistent data that can be modified by transactional requests. Persistent data is that data that will survive a system restart. Persistent data typically resides on disk storage devices, non-volatile memory or similar devices.

Transactional objects are used to implement two types of application servers: a transactional server 124 and a recoverable server 126. A recoverable server implements protocols necessary to respond to a transactional server and ensure that all participants in the transaction agree on the outcome, either to commit the transaction or roll-back the transaction, and to be able to recover from failure. A recoverable object is a transactional object, but not all transactional objects are recoverable. Non-recoverable transactional objects may implement their state using some other recoverable object.

A recoverable object must participate in Transaction Service 130 protocols. Transaction Services 130 maintain certain data defining the scope of each transaction as transaction context 132. A transaction context 132 is associated with each ORB-aware thread (Object Request Broker (ORB) characteristics are defined by the OMG, CORBA architecture.) The transaction context 132 is submitted with each request generated from the client application and is used to define operational environment characteristics where the request is processed. Contents of the transaction context 132 can include a reference to the transaction coordinator, ancestor references for nested transactions, a globally unique transaction id for the transaction coordinator and implementation specific data understood by the subordinate transaction coordinator.

Recoverable objects participate in Transactional Services 130 by registering a Resource 128 with the Transaction Service. The Transaction Service 130 drives the commit protocol (the two phase commit) by contacting those resources registered for a transaction.

A transactional server 124 is a collection of one or more objects whose behavior is affected by the transaction but have no recoverable states of their own. A transactional server implements transactional changes using other recoverable objects. A transactional server does not participate in the completion of the transaction but can force the transaction to be rolled back by sending a roll back message 140.

A recoverable server 126 is a collection of objects, at least one of which is recoverable. A recoverable server participates in the protocols by registering one or more Resource objects 128 with the Transaction Service using a Registration message 142. The Transaction Service drives the commit protocol by issuing requests 144 to the resources registered for a transaction.

Figure 3:
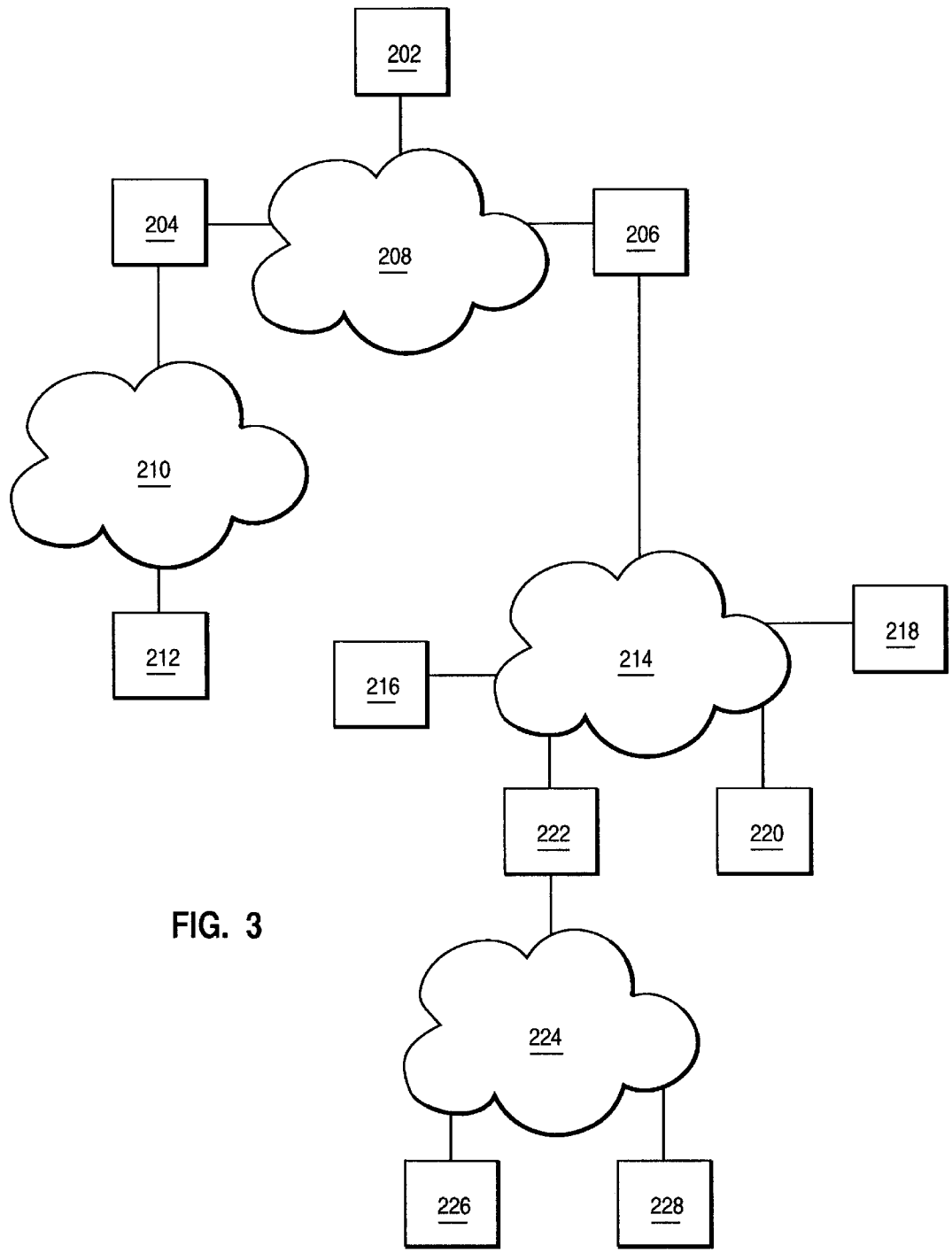
FIG. 3 is a block diagram illustrating a system of distributed computers interconnected by networks in which the preferred embodiment of the present invention is applied.

An example of a distributed processing system according to the present invention is shown generally in FIG. 3. Several computer systems are interconnecting using communication networks. For example, systems 212 and 204 are connected by network 210. Systems 204, 202, and 206 by network 208. Systems 206, 216, 218, 220, and 222 by network 214 and systems 222, 226, and 228 by network 224. The networks can be any known local area network (LAN) or wide area network (WAN), including token ring, Ethernet or other network. The "network" can also be the communication bus between multiple processes in a single computer system.

Figure 4:
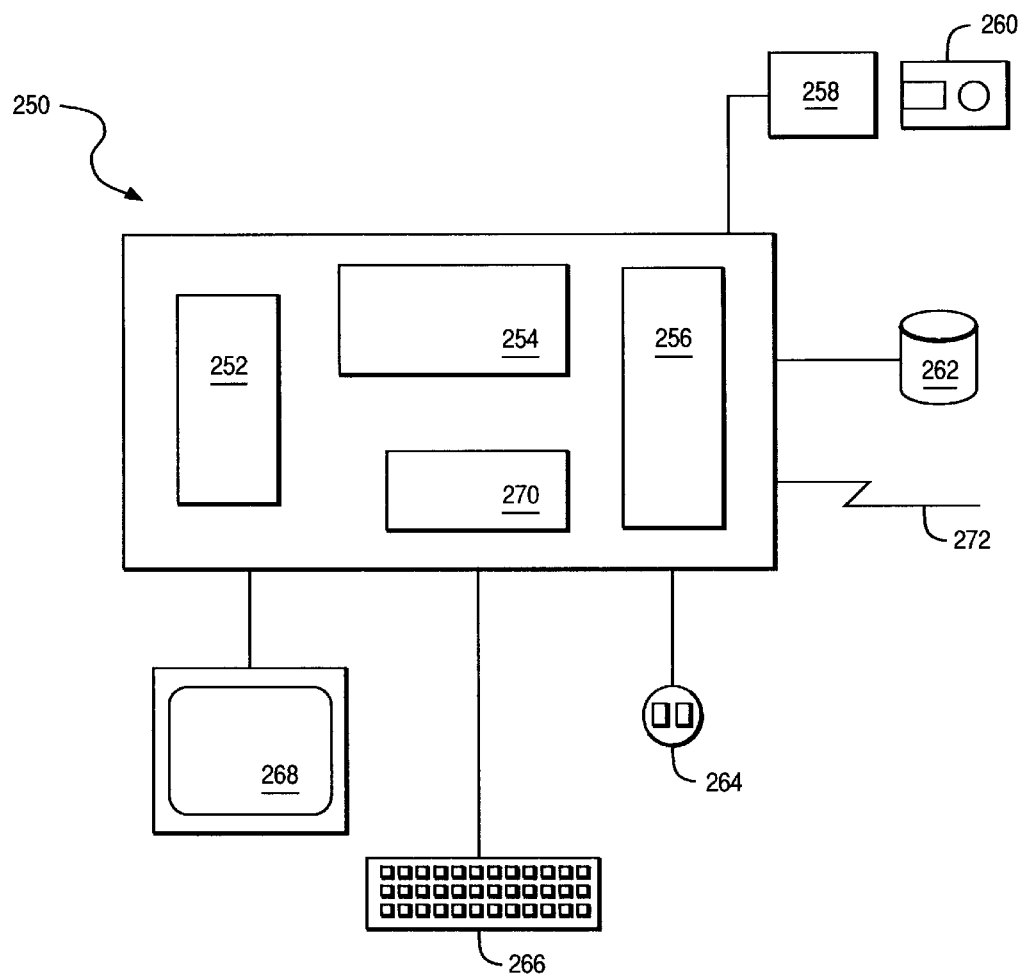
FIG. 4 is a block diagram of a computer system that implements the present invention.

A typical computer system is shown in FIG. 4. Each system 250 contains one or more central processing units 252, volatile memory 254, and input/output controller 256. The input/output controller 256 manages writing to magnetic or optical disk storage 262, removable storage 258, 260 and to display 268, keyboard 266 and pointing device 264. System communication controller 270 manages communications with a network via communication link 272. This configuration is provided for exemplary purposes only and is not intended to be limiting. A commercially available computer system such as the IBM PS/2 computer or IBM RISC System/6000 workstation are examples of the types of systems on which the invention may be practiced. (PS/2 and RISC System/6000 are trademarks of the IBM Corporation.) As discussed above, the systems of a distributed environment may all be linked via a single communications bus sharing memory and disk storage.

Computer system 250 is controlled by an operating system such as the OS/2 operating system, or the AIX operating system (OS/2 and AIX are trademarks of the IBM Corporation.) Network communications may be managed by a network operating system such as Novell Netware operating system, or the IBM LAN Server operating system (Netware is a trademark of the Novell Corp.)

The present invention is practiced using a program in computer memory or suitable hardware to control a computer system such as those described above.

An object oriented application 120 performs transaction operations using the objects and classes defined by the OMG Object Transaction Services model. These classes provide an object oriented interface or API into the OMG OTS. The present invention is the preferred approach to solve the problem of efficiently interoperating an OTS object oriented transaction system with the existing Encina procedural transaction manager by building an object transaction service around existing support in the Encina procedural transaction coordinator.

This approach to interoperation between the object and the Encina procedural transaction environments provides high level classes for a consistent object oriented interface to applications and provides classes to coordinate the overall atomic transaction. At the same time, it allows the TRAN portion of the Encina procedural transaction coordinators to be effectively inserted into the final object transaction service.

Figure 5:
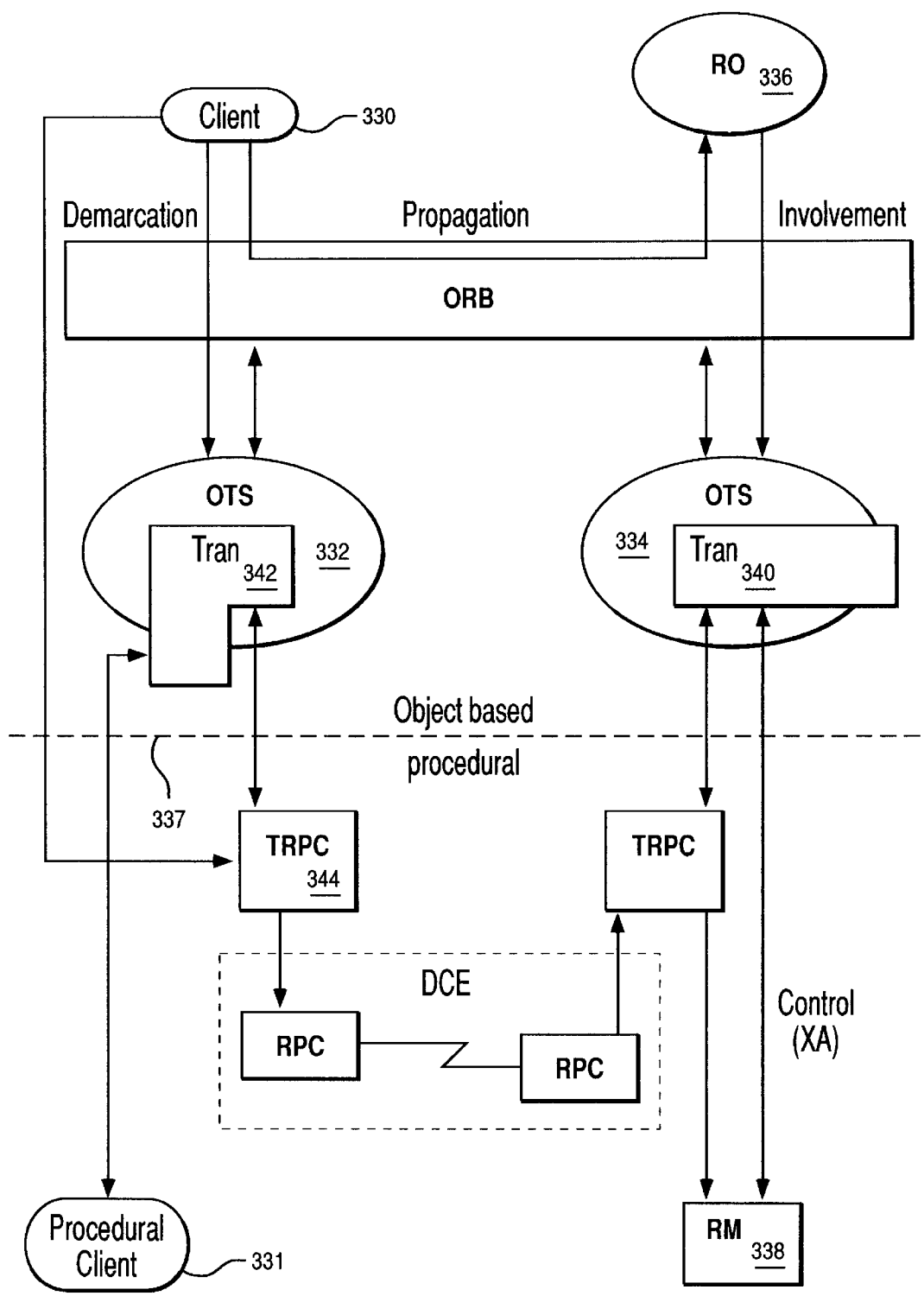
FIG. 5 is a diagram illustrating the transaction flow for interoperation between an object oriented and an Encina procedural transaction environment.

An example of interoperation with Encina through usage of TRAN as a coordinator according to the present invention is illustrated in FIG. 5. FIG. 5 illustrates interoperation between an OMG OTS environment and an Encina procedural transaction environment. The client application 330 invokes the object transaction services (OTS) through OMG defined object oriented interfaces. OTS 332 provides transaction services including propagating the transaction to the server using the OMG defined Object Request Broker (ORB) interfaces. Server OTS 334 involves a recoverable object 336 in the transaction as required and accesses an Encina procedural transaction manager (TRAN) 340 to synchronize transaction state information. As illustrated in the figure, the Encina procedural interface, TRAN, is imbedded in both the client and server OTS 340 342. The details of how the procedural interface is embedded are set forth below.

Within the client application 330, Encina procedural transaction requests can be made directly, without invoking the OTS interface. The requests use the API provided through the TRAN remote procedure call interface (TRPC) 344. TRAN 342, accessible both to OTS 332 and direct TRPC 344, is accessed to manage the Encina transactional request which is sent to the TRAN 340 on the server. The request is processed by an existing Resource Manager (RM) 338.

The environment depicted in FIG. 5 can be divided into object based and procedural environments as shown by dividing line 337. The TRAN components 340 342 are actually procedural components but are shown imbedded within OTS as taught by the present invention. The procedural interfaces of TRAN components 340 342 remain available for use by procedural transactions requests. For example, an existing Encina application 331 can make procedural API calls directly to TRAN 342. TRAN supports existing Encina applications without change. Distributed operations are supported using the existing RPC based communication between the client and server TRANs. Object based requests for distributed service are handled by the ORB rather than directly by TRAN. For example, client 330 may propagate a transaction to recoverable object 336 via the ORB. Recoverable object 336 involves OTS 334 which, in turn, uses the services of TRAN 340 for transaction coordination.

Interoperation as defined in the present invention is the capability to have object and procedural transaction operations occur within a single atomic transaction. The present invention introduces a novel set of "implementation objects" that provide interoperation through the careful usage of the TRAN portion of the Encina procedural transaction manager from within the Object Transaction Service. Interoperation is between object transactional requests managed by the Object Transaction Service and Encina procedural transactional requests managed by the Encina product.

Figure 6:
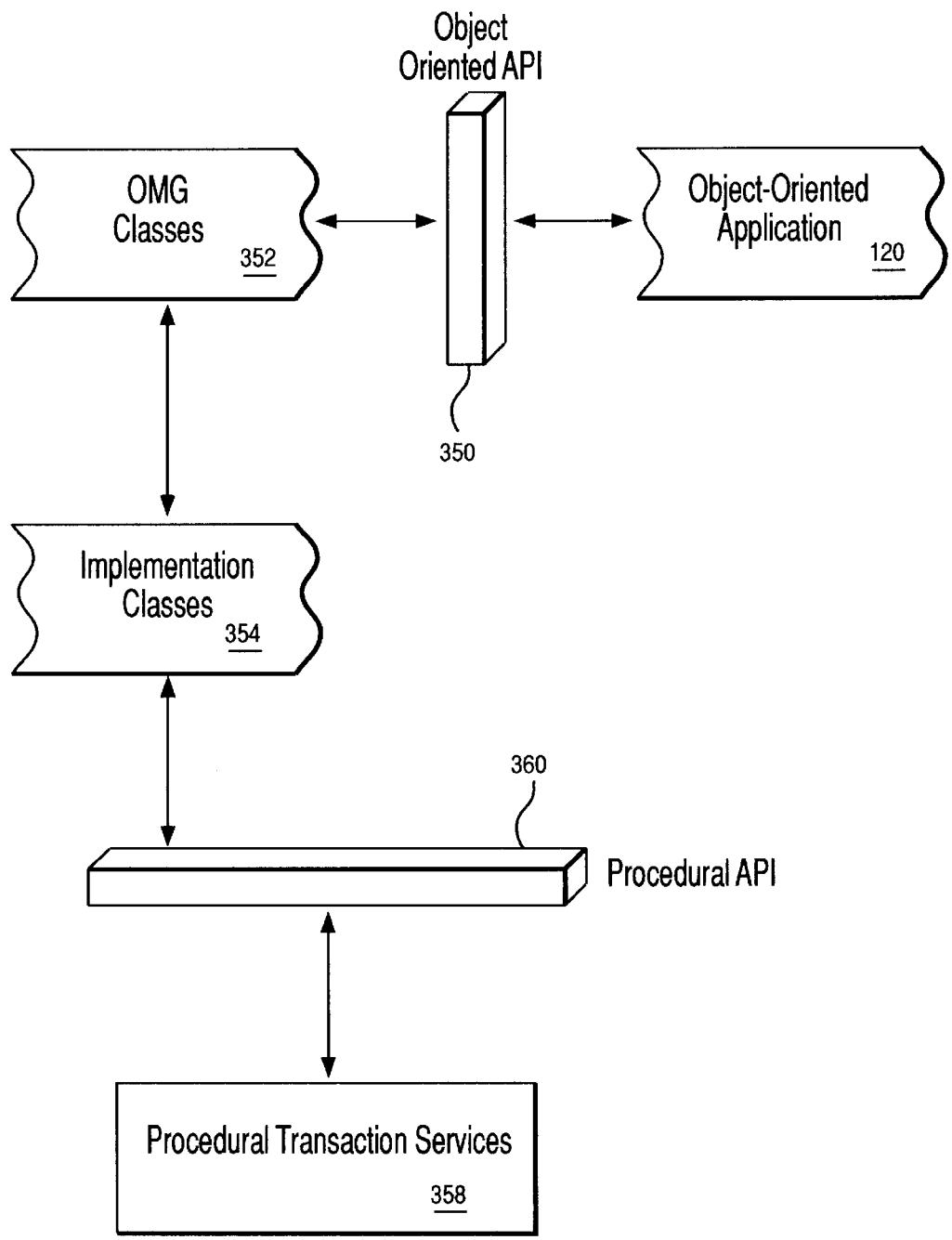
FIG. 6 is a diagram illustrating the relationship between object classes and Encina procedural transaction services.

The design of the implementation classes that define these "implementation objects" must avoid conflicts and inconsistencies that could prevent interoperation. Before describing the specific aspects of the implementation classes used to interoperate with Encina, a general description of the relationship of the implementation classes to other transaction services must be described. Briefly, the relationship is shown in FIG. 6. An object oriented application 120, as discussed above, accesses OMG Object Transaction Services through an object oriented API 350. This API is, in fact, the API specified by OMG for the Object Transaction Services and is provided and implemented by the OMG defined classes 352. Implementation classes 354 are provided by the present invention to bridge OMG classes 352 to the TRAN portion of the Encina procedural transaction services 358. The implementation classes 354 have defined object oriented interfaces 356 that are used by the OMG classes 352. Implementation classes 354 communicate through a selected set of Encina procedural APIs 360 to the TRAN portion of the Encina procedural transaction services 358. This novel implementation preserves the standard OMG interface and the OMG class implementations. The implementation classes 354 encapsulate the object-to-Encina procedural interface.

Objects in an object oriented software system perform operations on object data using object methods. An operation is requested by sending a message to a selected object requesting performance of a method. For example, the OMG OTS specifies that a new transaction is started by sending a BEGIN ( ) message to the CURRENT object. (This is represented in shorter form as: CURRENT::BEGIN( ).) Any required parameters must be provided within the parentheses. This message will cause the 'BEGIN' method of the object 'CURRENT' to be invoked. The set of objects and methods defines the object oriented interface or API.

Figure 7:
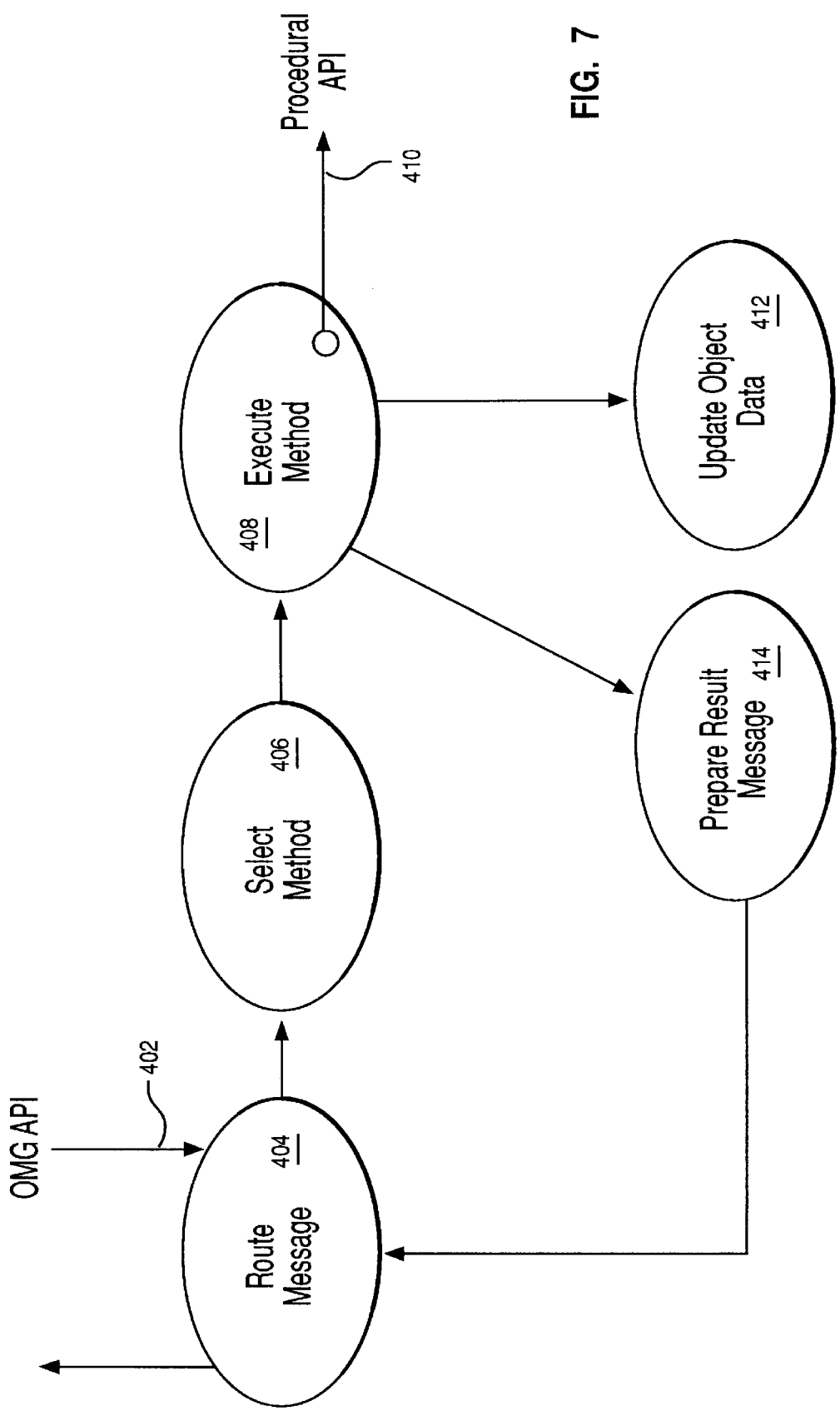
FIG. 7 is a diagram illustrating the flow of control in a transaction according to the present invention.

An object method can invoke other object methods or can carry out a function using functional code that is essentially procedural code. The flow of control in an object oriented system is illustrated in FIG. 7. A message 402 is sent by an application program. The object oriented system routes 404 the message to an appropriate object for method selection using known object oriented system techniques. The requested method is selected 406 and executed 408. The present invention includes the necessary procedural transaction statements in an object method. The procedural statement invokes a procedural API 410 requesting the necessary transaction processing. Results returned from the procedural call may be used to update the object's data 412 or may be included in a message 414 to another object requesting a change to its data or other action based on the results. This new message is routed using the message routing process 404.

The present invention is directed to the novel design of implementation classes within the Object Transaction Service and the Encina TRAN toolkit. The following architectural features of the OTS system using TRAN to provide the underlying coordinator implementation are the base from which the implementation classes are defined:

1) The OTS appears to TRAN as a local Recovery Service. Most interaction with TRAN is through the OTS TransactionManager implementation class. The OTS TransactionState implementation class uses the TRAN interface for transaction identifier allocation. This design assumes all servers are recoverable.

2) There is no direct TRAN-to-TRAN communication for object transactional requests managed by the OTS. For procedural Encina transactions, TRAN-to-TRAN communications will operate unchanged from current Encina implementations.

3) The OTS manages all of the Resources and subordinate CoordinatorResources, and distributes the two phase commit (2PC) operations when directed to do so by TRAN.

4) The OTS tells TRAN the outcome of each transaction in each process. It uses application-controlled PREPARE for this purpose; each TRAN insists on being the Coordinator for the transaction it is managing for the OTS.

A specific implementation class structure is needed to allow interoperability between object and procedural transactions. The implementation classes of the present invention therefore transform the object oriented API defined by the OMG OTS specification into procedural actions that can be performed by the TRAN component of the Encina transaction coordinator. The implementation classes provide the coordination between the existing Encina procedural transaction service and the OTS function. The OMG defined classes are standard across implementations of the OMG OTS and are reproduced in Table I below.

TABLE I

OMG Classes

| Class | Description |
| --- | --- |
| Current | Begin, end, and obtain information about a transaction |
| Factory | Create a new transaction along with necessary objects |
| Control | Obtains Terminator and Coordinator for a transaction |
| Terminator | Terminate by commit or rollback |
| Coordinator | Coordinate resources and two phase commit processing |
| RecoveryCoordinator | Coordinate recovery of a transaction |
| Resource | Represents the objects participating in the transaction |
| SubTransactionAware Resource | Subset of Resource required for nested transactions |
| Transactional Object | Used by object to indicate it is transactional |

Overall, the implementation classes are constructed to better structure the OMG function and most importantly to isolate the common bridge points to procedural APIs. The preferred embodiment of the present invention includes a number of implementation classes, a subset of which are listed in Table II.

TABLE II

Implementation Classes (Subset)

| Implementation Class | Description |
| --- | --- |
| SuperiorInfo | Collects information that maps to the superior Coordinator |
| NestingInfo | Tracks subordinate and ancestor Coordinators for nested transactions |
| RegisteredResources | Manage a set of Resource objects involved in a transaction |
| TransactionState | Maintain persistent state of a Coordinator |
| M_TransactionState | Metaclass of TransactionState |
| Transaction Manager | Manages the overall transaction using OMG and implementation objects |

A subset of OTS implementations classes from the overall set of implementation classes encapsulates the interaction with the TRAN function from the Encina product and are listed in Table III below.

TABLE III

Implementation Classes for Encina Usage

| Implementation Class | Description |
| --- | --- |
| CoordinatorResource 602 | Used to manage termination operations for resources on subordinate systems. Invokes TRAN termination operations. |
| CoordinatorTermination 604 | Implements the termination operations for the overall transaction. Invokes TRAN termination operations on the superior(Client's) system. |
| TransactionManager 606 | Provides all of the Recovery Service (REC) upcalls to TRAN. Initialize the TRAN service appropriately for how it is used by the OTS. |
| TransactionState 608 | Remembers the state of the transaction. Involved in the appropriate initialization of TRAN for use by the OTS. |

Figure 8:
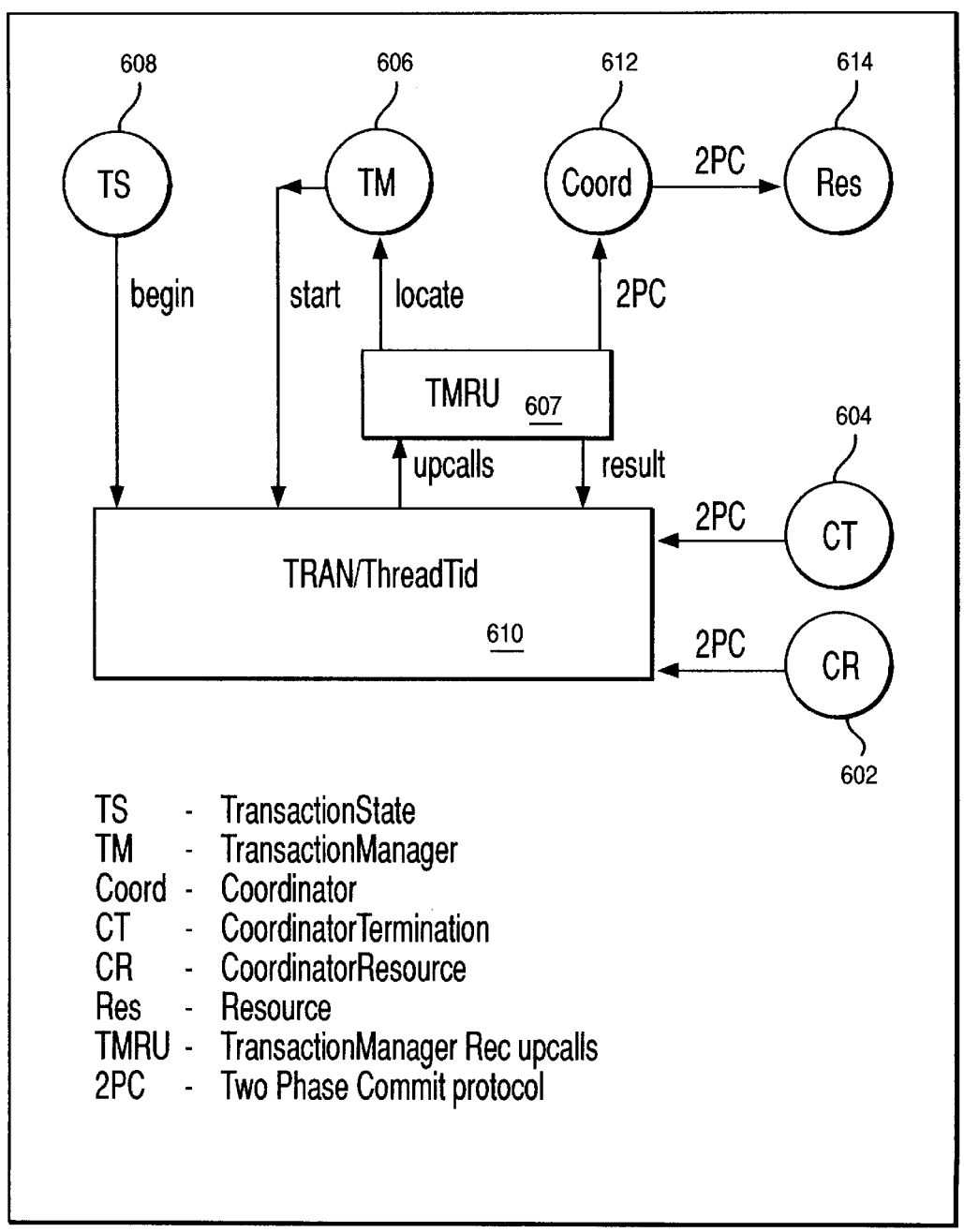
FIG. 8 is a diagram illustrating the OTS implementation classes that communicate with the TRAN component of the Encina product.

Interoperation between the object and procedural transactions is made possible by the use of TRAN function from within the OTS. The present invention uses specific initialization options in TRAN, communication from the OTS implementation classes to TRAN via selected Encina APIs, and communication from TRAN to the OTS via upcalls from TRAN to specific OTS implementation classes. "Upcalls" are procedural invocations of methods, in this case, the procedural TRAN code causes invocation of an OTS method. The Transaction Manager Rec Upcall object (TMRU) 607 transforms upcalls into the method invocations necessary to interact with the Transaction Manager 606 and Coordinator 612. Results from upcall methods are returned to TRAN 610 by TMRU 607. This novel structure of implementation classes, initialization operations, and cross communication between TRAN and the OTS is the basis of the present invention. FIG. 8 provides an overview of the OTS implementation classes that communicate with TRAN functions from the Encina product.

Initialization of the TRAN environment is critical for the communication between the two services. The TRAN calls used by the implementation classes to accomplish this are:

1) When the OTS TransactionManager 606 implementation class is created, it needs to declare the standard environment using a tran_StandardEnvironment call.

2) If the application has not already done so, the OTS TransactionManager 606 needs to initialize TRAN using a tran_Init call.

3) The tran_RecInit call passes to TRAN the addresses of a collection of procedures that implement the various recovery functions. The OTS TransactionManager 606 class provides a set of procedures to implement the recovery (REC) upcalls.

4) Once initialization is complete, the tran_Ready operation informs TRAN.

Transaction initiation is the next point where communication between the OTS implementation classes and TRAN is required. The TRAN calls used by the OTS implementation classes to accomplish this are:

1) A request to allocate a new transaction identifier is the trigger to start a new transaction or subtransaction. The tran_Begin operation is invoked, and this returns a local identifier which must be used on subsequent calls to TRAN.

2) If the transaction is a subordinate transaction, the tran_DeferCommit operation is used to tell TRAN that the OTS wishes to provide the outcome of the transaction to the subordinate.

3) The tran_PropertyRetrieve operation is used to obtain the globally unique transaction identifier. The OTS TransactionState must construct an XID to return to the calling OTS Coordinator, and this should contain the values returned by TRAN so that the OTS TransactionState does not have to be responsible for permanently recording the value.

4) For subtransactions, the tran_CallAfterCWRT operation is used to ask TRAN to inform the OTS when a subtransaction is committed with respect to its parent.

Transaction termination is the final point where communication is needed between the OTS implementation classes and TRAN to implement interoperation. The implementation must ensure that the commit/rollback vote of TRAN is included in the OTS consolidated vote. The OTS must also supply its vote to TRAN in certain cases. The TRAN calls used by the OTS implementation classes to accomplish this are:

First Phase-Prepare

1) The OTS CoordinatorTermination 604 uses tran_End or tran_Abort to end a transaction. In a subordinate, the OTS CoordinatorResorce 602 passes a prepare request to TRAN 610 using the tran_Prepare operation. It then invokes the OTS Coordinator::prepare operation.

2) For a top-level transaction, the upcallRecPrepare operation is invoked.

3) Once the OTS TransactionCoordinator::prepare operation returns, the tran_RecRefuse or 4) tran_RecReadonly operations may be invoked to indicate the result to TRAN 610.

5) The tran_Prepare operation response indicates the consolidated result as either success or failure.

6) In a subordinate, TRAN 610 enters the prepared state, but will not immediately go on to the second phase because we have called tran_DeferCommit; the OTS CoordinatorResource 602 converts the 610 TRAN response into an OMG response and returns it to its superior.

Second Phase-Commit

7) For subordinates, the OTS CoordinatorResource 602 passes a commit request to TRAN 610 using the tran_ProvideOutcome operation.

8) The upcallRecCommit operation identifies the OTS Coordinator 612 from the transaction identifier (the OTS TransactionManager 606 maintains that mapping), and invokes the OTS Coordinator::commit operation.

Second Phase-Rollback

9) For subordinates, the OTS CoordinatorResource 602 passes a rollback request to TRAN 610 using the tran_Abort operation or the tran_ProvideOutcome operation. The OTS can only use the tran_provideOutcome operation if the transaction was successfully prepared, so the OTS must use tran_Abort for rollbacks without prepares.

10) For top-level transactions or subtransactions the upcallRecAbort operation identifies the OTS Coordinator 612 from the transaction identifier and invokes the OTS Coordinator::rollback operation.

Result Returned

11) If the transaction was committed, the OTS should raise a TransactionRolledBack exception and return it to the client. The tran_End operation returns TRAN_SUCCESS if the transaction completed successfully, and TRAN_ TID_NOT_VALID if the transaction rolled back, so this value is used to decide whether to raise the exception.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A computer implemented system for interoperably processing object oriented transaction requests with procedural transaction requests using an existing procedural transaction coordinator, said interoperation supporting procedural and object oriented transaction operations within a single atomic transaction having a single transaction result, the system comprising:

a procedural coordinator having a plurality of procedural programming interfaces;

first means for requesting transaction processing through said plurality of procedural programming interfaces from an object oriented transaction processing system, said first means for requesting returning a first result;

means for managing object oriented transactions originating in an object oriented application;

second means for requesting transaction processing through said plurality of procedural programming interfaces from a procedural transaction processing system, said second means for requesting returning a second result;

means for invoking one or more object oriented processing methods from said procedural coordinator said object oriented processing methods being methods of said means for managing object oriented transactions; and means for coordinating atomic transaction completion such that said transaction result depends upon both said first and second results, said means for coordinating invoking said means for managing object oriented transactions to coordinate object oriented transaction completion.

2. The system of claim 1 wherein said procedural coordinator is an Encina TRAN coordinator.

3. The system of claim 1 further comprising:

a second procedural coordinator logically distributed apart from said procedural coordinator;

first communication means for communicating between said procedural coordinators when said second means for requesting transaction processing requires communication between said procedural coordinators; and second communication means for communicating between said procedural coordinators when said first means for requesting transaction processing requires coordination between said procedural coordinators.

4. The system of claim 3 wherein said procedural coordinator and said second procedural coordinator are Encina TRAN coordinators.

5. The system of claim 4 wherein said first communication means is a remote procedure call interface and said second communication means is an object request broker (ORB) interface.

6. A computer program product having a computer readable medium having computer program logic recorded thereon for interoperably processing object oriented transaction requests with procedural transaction requests using an existing procedural transaction coordinator, said interoperation supporting procedural and object oriented transaction operations within a single atomic transaction having a single transaction result, the computer program product comprising:

program product procedural coordinator means having a plurality of procedural programming interfaces;

first program product means for requesting transaction processing through said plurality of procedural programming interfaces from an object oriented transaction processing system, said first program product means for requesting returning a first result;

second program product means for requesting transaction processing through said plurality of procedural programming interfaces from a procedural transaction processing system, said second program product means for requesting returning a second result;

third program product means for managing object oriented transactions originating in an object oriented application;

fourth program product means for invoking an object oriented processing method from said program product procedural coordinator means; and fifth program product means for coordinating atomic transaction completion such that said transaction result depends upon both said first and second results, and said fifth program product means invokes said third program product means for coordinating object oriented transaction completion.

7. The program product of claim 6 wherein said program product procedural coordinator means is an Encina TRAN coordinator.

8. The program product of claim 6 further comprising:

second program product procedural coordinator means logically distributed apart from said program product procedural coordinator;

first program product communication means for communicating between said program product procedural coordinators when said second program product means for requesting transaction processing requires communication between said program product procedural coordinators; and second program product communication means for communicating between said program product procedural coordinators when said first program product means for requesting transaction processing requires coordination between said program product procedural coordinators.

9. The program product of claim 8 wherein said program product procedural coordinator and said second program product procedural coordinator are Encina TRAN coordinators.

10. The program product of claim 9 wherein said first program product communication means is a remote procedure call interface and said second program product communication means is an object request broker (ORB) interface.

11. A computer implemented method for using an existing procedural coordinator to coordinate a single atomic transaction that includes both object based transaction requests and procedural transaction requests, the method comprising the steps of:

invoking an object method to initialize a coordination environment with said existing procedural coordinator;

sending by said object method to said existing procedural coordinator one or more object procedure addresses for object method invocation from said existing procedural coordinator;

initializing an object based transaction by invoking a procedural transaction initialization interface to said existing procedural coordinator;

receiving object based and procedural based requests for coordination by said existing procedural coordinator;

returning request results to said object based transactions by invoking an object method from said existing procedural coordinator;

coordinating atomic transaction termination by said existing procedural coordinator such that both object based results and procedural results are evaluated in deciding whether to commit or rollback the transaction, said object based results being coordinated by an object oriented coordinator.

12. The method of claim 11 wherein the procedural coordinator is an Encina TRAN coordinator.

13. The method of claim 11 wherein the step of coordinating transaction termination includes the steps of:

sending prepare messages to all recoverable objects involved in said transaction including both object controlled and procedural controlled recoverable objects;

receiving a response to said prepare messages;

invoking by said procedural coordinator of an object recovery method to communicate prepare status using a procedural object method invocation;

invoking by said procedural coordinator of an object recovery method to commit the transaction if said prepare status indicates commitment;

indicating transaction rollback otherwise.

14. The method of claim 12 wherein the step of coordinating atomic transaction termination includes the steps of:

sending prepare messages to all recoverable objects involved in said transaction including both object controlled and procedural controlled recoverable objects;

receiving a response to said prepare messages;

invoking by said procedural coordinator of an object recovery method to communicate prepare status using a procedural object method invocation;

invoking by said procedural coordinator of an object recovery method to commit the transaction if said prepare status indicates commitment;

indicating transaction rollback otherwise.

15. The method of claim 13, further comprising the steps of:

before commit processing, testing to determine whether said transaction is a subtransaction in a nested transaction;

if a subtransaction, deferring commitment of said transaction until the root nested transaction is committed.

* * * * *